(12) United States Patent
Nakayama et al.

(10) Patent No.: US 9,969,145 B2
(45) Date of Patent: May 15, 2018

(54) VEHICLE-WINDSHIELD-GLASS INTERMEDIATE FILM, ROLLED BODY, AND VEHICLE WINDSHIELD GLASS

(71) Applicant: SEKISUI CHEMICAL CO., LTD., Osaka (JP)

(72) Inventors: Kazuhiko Nakayama, Shiga (JP); Hiroaki Inui, Shiga (JP); Hirofumi Kitano, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days. days.

(21) Appl. No.: 15/108,413

(22) PCT Filed: Apr. 9, 2015

(86) PCT No.: PCT/JP2015/061143
§ 371 (c)(1),
(2) Date: Jun. 27, 2016

(87) PCT Pub. No.: WO2015/156365
PCT Pub. Date: Oct. 15, 2015

(65) Prior Publication Data
US 2016/0318278 A1    Nov. 3, 2016

(30) Foreign Application Priority Data
Apr. 9, 2014 (JP) .................................. 2014-080241

(51) Int. Cl.
*B32B 3/30* (2006.01)
*B60J 1/02* (2006.01)
(Continued)

(52) U.S. Cl.
CPC ................ *B32B 3/30* (2013.01); *B32B 3/263* (2013.01); *B32B 17/10036* (2013.01);
(Continued)

(58) Field of Classification Search
CPC ........ B32B 17/10587; B32B 17/10036; B32B 17/10761; B32B 2307/102; B32B 2605/006; B32B 3/28; B60J 1/02
(Continued)

(56) References Cited

U.S. PATENT DOCUMENTS 5,641,558 A * 6/1997 Noda ................ B32B 17/10018
428/195.1
7,280,170 B2 * 10/2007 Ambrose ................ B29C 55/06
349/62
(Continued)

FOREIGN PATENT DOCUMENTS

JP 6-127983 5/1994
JP 09-295839 11/1997
(Continued)

OTHER PUBLICATIONS

International Search Report (ISR) dated Jun. 23, 2015 in corresponding International Application No. PCT/JP2015/061143.
(Continued)

*Primary Examiner* — D Glenn Dayoan
*Assistant Examiner* — Sunsurraye Westbrook
(74) *Attorney, Agent, or Firm* — Wenderoth, Lind & Ponack, L.L.P.

(57) ABSTRACT

The present invention aims to provide an interlayer film for an automotive windshield which, while having recesses in the shape of engraved lines, enables the production of automotive windshields with high yield by a vacuum deaeration method; a roll of the interlayer film for an automotive windshield; and an automotive windshield including the interlayer film for an automotive windshield. The present invention relates to an interlayer film for an automotive windshield. The interlayer film includes, on at least one surface thereof, a large number of recesses and a large (Continued)

number of projections. The recesses have a groove shape with a continuous bottom. The recesses are adjacently arranged regularly side by side in parallel with one another. The recesses in a groove shape with a continuous bottom are inclined 35° or more relative to the machine direction of the film in production of the interlayer film for an automotive windshield.

12 Claims, 2 Drawing Sheets

(51) Int. Cl.
  *B32B 3/26* (2006.01)
  *B32B 17/10* (2006.01)
(52) U.S. Cl.
  CPC .............. *B32B 17/1055* (2013.01); *B60J 1/02* (2013.01); *B32B 2250/03* (2013.01); *B32B 2307/102* (2013.01); *B32B 2605/08* (2013.01)
(58) Field of Classification Search
  USPC .......... 296/84.1, 93, 146.15, 201, 78.1, 200; 428/182, 186
  See application file for complete search history.

(56) References Cited

U.S. PATENT DOCUMENTS

| | | | | |
|---|---|---|---|---|
| 8,486,535 B1* | 7/2013 | Nemeth | ................. | B60J 1/2094 296/84.1 |
| 8,910,992 B2* | 12/2014 | Grech | ........................ | B60J 1/02 296/178 |
| 8,980,402 B2* | 3/2015 | Payen | ............... | B32B 17/10036 296/84.1 |
| 2006/0110593 A1* | 5/2006 | Fukatani | ........... | B32B 17/10036 428/328 |
| 2006/0238111 A1* | 10/2006 | Shimizu | .............. | H01L 51/5234 313/503 |
| 2009/0305059 A1* | 12/2009 | Marumoto | ........ | B32B 17/10036 428/437 |
| 2013/0240365 A1* | 9/2013 | Tsuchiya | ................. | A61L 27/54 205/112 |
| 2015/0174862 A1* | 6/2015 | Kitano | .................... | B32B 27/08 428/186 |
| 2016/0151996 A1 | 6/2016 | Kitano et al. | | |

FOREIGN PATENT DOCUMENTS

| | | |
|---|---|---|
| JP | 2001-48599 | 2/2001 |
| JP | 2001-150540 | 6/2001 |
| JP | 2001-163641 | 6/2001 |
| JP | 2001-261385 | 9/2001 |
| JP | 2003-128442 | 5/2003 |
| JP | 2003-212614 | 7/2003 |
| JP | 2012-92202 | 5/2012 |
| WO | 95/19885 | 7/1995 |
| WO | 2015/016365 | 2/2015 |

OTHER PUBLICATIONS

Extended European Search Report dated Nov. 21, 2017 in European Patent Application No. 15776478.8.

* cited by examiner (a)

(b)

VEHICLE-WINDSHIELD-GLASS INTERMEDIATE FILM, ROLLED BODY, AND VEHICLE WINDSHIELD GLASS

TECHNICAL FIELD

The present invention relates to an interlayer film for an automotive windshield which, while having recesses in the shape of engraved lines, enables the production of automotive windshields with high yield by a vacuum deaeration method; a roll of the interlayer film for an automotive windshield; and an automotive windshield including the interlayer film for an automotive windshield.

BACKGROUND ART

A laminated glass in which two glass plates and an interlayer film for an automotive windshield containing a thermoplastic resin, such as plasticized polyvinyl butyral, are bonded to one another is widely used as an automotive windshield.

One method for producing such an automotive windshield is a vacuum deaeration method.

According to the vacuum deaeration method, a laminate including at least two glass plates with an interlayer film for an automotive windshield therebetween is put in a rubber bag. The laminate is vacuum suctioned, so that the laminate is preliminarily pressure-bonded while the air remaining between the glass plate and the interlayer film is removed. The laminate is then pressurized with heat, for example, in an autoclave to be fully pressure-bonded. Thus, an automotive windshield is obtained.

In the production of an automotive windshield, deaeration properties upon lamination of glass and the interlayer film for an automotive windshield are important. The interlayer film for an automotive windshield has minute projections and recesses on at least one surface thereof to ensure deaeration properties in the production of a laminated glass. In particular, when recesses among the projections and recesses have a groove shape with a continuous bottom (hereafter, also referred to as a "shape of an engraved line") and such recesses in the shape of engraved lines are regularly formed to be adjacently arranged in parallel with one another, excellent deaeration properties can be exhibited (see Patent Literature 1, for example).

However, yield may be reduced when automotive windshields are produced by a vacuum deaeration method using such an interlayer film for an automotive windshield with recesses in the shape of engraved lines.

CITATION LIST

Patent Literature

Patent Literature 1: JP 2001-48599 A

SUMMARY OF INVENTION

Technical Problem

An object of the present invention is to provide an interlayer film for an automotive windshield which, while having recesses in the shape of engraved lines, enables the production of automotive windshields by a vacuum deaeration method with high yield, a roll of the interlayer film for an automotive windshield, and an automotive windshield including the interlayer film for an automotive windshield.

Solution to Problem

The present invention is directed to an interlayer film for an automotive windshield, the interlayer film including, on at least one surface thereof, a large number of recesses and a large number of projections, the recesses having a groove shape with a continuous bottom, the recesses being adjacently arranged regularly side by side in parallel with one another, the recesses in a groove shape with a continuous bottom being inclined at 35° or more relative to the machine direction of the film in the production of the interlayer film for an automotive windshield. As used herein, the phrase "having a large number of recesses and a large number of projections on at least one surface" also means that "a large number of recesses and a large number of projections are formed on at least one surface". The phrase "recesses being adjacently arranged regularly side by side in parallel with one another" also means that "recesses are adjacently formed regularly side by side in parallel with one other".

The present invention is specifically described in the following.

The present inventors studied the cause of the low production efficiency in the production of automotive windshields by a vacuum deaeration method. They found that during handling a laminate including at least two glass plates with an interlayer film for an automotive windshield therebetween, the glass and the interlayer film for an automotive windshield are often displaced from each other. In particular, when a laminate is put in a rubber bug and transported to the step of preliminary pressure bonding, the laminate is transported standing in the longitudinal direction of the windshield (standing such that the longitudinal direction is in parallel with the ground). During the transportation, the glass's own weight easily causes displacement in the laminate. Preliminary pressure bonding and full pressure bonding of such a laminate with displacement result in a defective item, which lowers the yield.

After intensive studies, the present inventors found that the likelihood of the occurrence of the displacement between the glass and the interlayer film for an automotive windshield is susceptible to the angle of the recesses in the shape of engraved lines on the surface of the interlayer film for an automotive windshield. They also found that the displacement can be reduced or prevented by forming the recesses in the shape of engraved lines such that they are inclined at 35° or more relative to the machine direction of the film in the production of the interlayer film for an automotive windshield. Thus, they completed the present invention.

The interlayer film for an automotive windshield of the present invention (hereinafter, also referred to simply as "interlayer film") has a large number of recesses and a large number of projections on at least one surface thereof. Thus, deaeration properties during the production of a laminated glass can be ensured. The projections and recesses may be formed on only one surface. The projections and recesses are preferably formed on both surfaces because the deaeration properties are markedly improved.

In the interlayer film of the present invention, the recesses among the projections and recesses on the at least one surface have a groove shape with a continuous bottom (shape of an engraved line) (hereinafter, also referred to as "recess in the shape of an engraved line"). The recesses are adjacently arranged regularly side by side in parallel with one another. The shape of the projections and recesses is at least a groove shape. For example, any shape commonly employed for projections and recesses formed on the surface of an interlayer film for laminated glass, such as the shape of engraved lines or a lattice, may be employed. The shape of the projections and recesses may be a shape transferred from an embossing roll. The projections may each have a top portion in a planar shape as illustrated in FIG. 1 or a non-planar shape as illustrated in FIG. 2. In a case where the projections each have a planar top portion, minute projections and recesses may be further formed on the plane of the top portion. The projections among the projections and recesses may have the same height or different heights. The recesses corresponding to these projections may have the same depth or different depths as long as they each have a continuous bottom.

Commonly, easiness of deaeration upon pressure-bonding of a laminate including an interlayer film between two glass plates closely relates to the communication properties and smoothness of the bottoms of the recesses. By forming the projections and recesses on at least one surface of the interlayer film in a pattern of recesses in the shape of engraved lines arranged regularly side by side in parallel with one another, the communication properties of the bottoms are further enhanced to markedly increase the deaeration properties.

In the state "arranged regularly side by side", the adjacent recesses are arranged side by side in parallel with one another at equal intervals or not necessarily at equal intervals between all the adjacent recesses. FIGS. 1 and 2 each schematically illustrate an exemplary interlayer film for laminated glass in which recesses in the shape of engraved lines are arranged side by side in parallel with one another at equal intervals. FIG. 3 schematically illustrates an exemplary interlayer film for laminated glass in which recesses in the shape of engraved lines are arranged side by side in parallel with one another at unequal intervals. In FIG. 3, an interval A between a recess 1 and a recess 2 and an interval B between the recess 1 and a recess 3 are different from each other. The recesses in the shape of engraved lines do not necessarily have an entirely continuous bottom. The recesses may have a partition on a part of the bottom.

In the interlayer film of the present invention, the recesses in the shape of engraved lines are inclined at 35° or more relative to the machine direction of the film in the production of the interlayer film for an automotive windshield. This effectively prevents the displacement between glass and the interlayer film even if the laminate is transported standing in the production of an automotive windshield by a vacuum deaeration. The inclination of the recesses in the shape of engraved lines is preferably 45° or more, more preferably 55° or more, relative to the machine direction of the film in the production of the interlayer film for an automotive windshield. The inclination of the recesses in the shape of engraved lines refers to an acute angle which the recesses in the shape of engraved lines form with the machine direction of the film in the production of the interlayer film for an automotive windshield. The upper limit of the inclination of the recesses in the shape of engraved lines is not limited, but preferably 90° or less, more preferably less than 90°, relative to the machine direction of the film in the production of the interlayer film for an automotive windshield.

The machine direction of the film in the production of the interlayer film for an automotive windshield can be determined by, for example, the following method. The interlayer film for an automotive windshield is stored in a constant-temperature bath at 140° C. for 30 minutes. The machine direction is either the parallel direction or the perpendicular direction of the film, in whichever shrinkage after the storage is greater. Alternatively, the machine direction is determined based on the winding direction of a roll of the interlayer film for an automotive windshield. Since a roll of the interlayer film for an automotive windshield is obtained by winding the interlayer film in the machine direction of the film in the production of the interlayer film for an automotive windshield, the winding direction of the roll is the same as the machine direction of the film in the production of the interlayer film for an automotive windshield. The roll obtained by winding the interlayer film for an automotive windshield according to the present invention in the machine direction of the film in the production of the interlayer film for an automotive windshield is also encompassed by the present invention. That is, the present invention encompasses a roll of an interlayer film for an automotive windshield, the interlayer film including a large number of recesses and a large number of projections on at least one surface thereof, the recesses having a groove shape with a continuous bottom, the recesses being adjacently arranged regularly side by side in parallel with one another, the recesses in a groove shape with a continuous bottom being inclined at 35° or more relative to the winding direction of the roll.

The lower limit of the roughness (Rz) of the recesses in the shape of engraved lines is preferably 10 µm, and the upper limit thereof is preferably 80 µm. When the roughness (Rz) of the recesses in the shape of engraved lines is within this range, excellent deaeration properties can be exhibited. The lower limit of the roughness (Rz) of the recesses in the shape of engraved lines is more preferably 20 µm, and the upper limit is more preferably 60 µm, still more preferably 50 µm.

As used herein, the roughness (Rz) of the recesses in the shape of engraved lines is Rz specified in JIS B-0601 (1994). The roughness (Rz) can be obtained by measuring perpendicular so as to transverse the direction in which the recesses in the shape of engraved lines are continuous. The measurement device may be, for example, "Surfcorder SE300" available from Kosaka Laboratory Ltd. The measurement may be performed at a cut-off value of 2.5 mm, a standard length of 2.5 mm, a measurement length of 12.5 mm, a spare length of 2.5 mm, and a stylus feed rate of 0.5 mm/sec, with a stylus having a tip radius of 2 µm and a tip angle of 60°. The measurement is performed at 23° C. and 30RH %.

FIG. 4 schematically illustrates an interval Sm between recesses and a radius of rotation R of a projection. In FIG. 4(*a*), projections and recesses 20 on a surface having a large number of recesses and a large number of projections include a recess 21 having a groove shape with a continuous bottom and a projection 22. The interval Sm means the interval between the recesses 21. In FIG. 4(*b*), the radius of rotation R is a radius of a circle drawn such that it contacts the tip of the projection 22.

The lower limit of the interval Sm between adjacent recesses in the shape of engraved lines is preferably 100 µm, and the upper limit thereof is preferably 500 µm. When the interval Sm between the recesses in the shape of engraved lines is within this range, excellent deaeration properties can be exhibited. The lower limit of the interval Sm between the recesses in the shape of engraved lines is more preferably 160 µm, and the upper limit thereof is more preferably 350 µm, still more preferably 250 µm.

The interval Sm between the recesses in the shape of engraved lines herein can be measured by observing a first surface and a second surface (observation range: 20 mm×20 mm) of the interlayer film for an automotive windshield using an optical microscope ("BS-D8000 III" available from SONIC Corp.) to measure the interval between adjacent recesses and calculating the average of the shortest distances between the deepest bottoms of the observed adjacent recesses.

In the interlayer film of the present invention, the projections each preferably have a tip with a radius of rotation of 20 μm or more. This enhances friction between the glass and the interlayer film, making it possible to more effectively prevent the displacement between the glass and the interlayer film in the production of an automotive windshield by a vacuum deaeration method. The upper limit of the radius of rotation of the tip of the projection is not limited. When the upper limit is 100 μm or lower, the films are not bonded to each other even if they are stacked on top of each other, which improves handleability.

The radius of rotation of the tip of a projection can be determined by the following method. The interlayer film for laminated glass is cut in the direction perpendicular to the direction of the recesses in the shape of engraved lines and perpendicular to the film thickness. The cross section is observed using a microscope (e.g., "DSX-100" available from Olympus Corp.) and photographed at a 555-fold magnification. Then, the obtained image is magnified to 50 μm/20 mm. In the magnified state, the radius of a circle drawn such that it is inscribed in the apex of a projection is measured with measurement software included with the microscope, and the resulting value is taken as the radius of rotation of the tip of the projection. The measurement is performed at 23° C. and 30RH %.

In the interlayer film of the present invention, the tip portions of the projections preferably have a roughness of 30 μm or less, more preferably 20 μm or less, still more preferably 11 μm or less. This enhances friction between the glass and the interlayer film, making it possible to more effectively prevent the displacement between the glass and the interlayer film in the production of an automotive windshield by a vacuum deaeration method. The lower limit of the roughness of the tip portions of the projections is not limited. When the lower limit is 0.1 μm or more, the films are not bonded to each other even if they are stacked on top of each other, leading to improved handleability. The roughness of the tip portions of the projections is preferably 0.5 μm or more. In order to adjust the roughness of the tip portions of the projections within the preferable range, for example, the conditions for embossing the film with the shape of engraved lines are adjusted.

The roughness of the tip portions of the projections can be determined as follows. Using a three-dimensional profilometer (e.g., "KS-1100" available from Keyence Corporation, head: model "LT-9510VM") and "KS-measure", measurement software included therewith, the roughness of the surface of the interlayer film is measured in a 2 cm×2 cm field of view. In the obtained data, the roughness within a length of 2.5 mm along the direction parallel to the direction in which the apex portions are continuous is measured at 10 sites on the apex portions of the projections. The average of the 10 obtained values is taken as the roughness of the tip portions of the projections. Here, the roughness refers to "Rz", which is determined as follows. "KS-Analyzer Ver. 2.00", analysis software included with the profilometer, is used in the line roughness measurement mode with a length condition set at "2500 μm". The area of interest is selected in the obtained three-dimensional image data, and roughness profile data of the area is obtained. The Rz is determined in accordance with JIS B-0601 (1994) from the roughness profile data. The roughness profile data is obtained at a cut-off value of 2.5 mm. Height smoothing and tilt correction are not performed. The measurement conditions other than the field of view are as follows: stage feed condition: continuous; scan direction: bi-directional scanning; leading axis: X-axis; stage travel rate: 250.0 μm/s; and axis feed rate: 10000.0 μm/s. The measuring pitch of X-axis is set at 2.0 μm, and that of Y-axis is set at 2.0 μm. When the interval between the engraved lines is so large that the measurement distance is insufficient, a field of view adjacent to the measured field of view may be measured in the same manner to increase the number of measurement sites. The "apex portion" of the projections in the measurement of the roughness of the tip portions refers to a range corresponding to 10% of the length of a straight line connecting the deepest bottom of two adjacent recesses in the 2 cm×2 cm field, centered on the middle of the straight line connecting the deepest bottoms. When the point at which the height of the projection is highest is not positioned at the middle of the straight line connecting the deepest bottoms of two adjacent recesses in the 2 cm×2 cm field of view, the apex portion is defined as a range corresponding to 10% of the length of the straight line connecting the deepest bottoms, centered on the point at which the height of the projection is highest.

The maximum height point of the projections is measured as follows. A cross-sectional profile in the direction perpendicular to the recesses in the obtained image is obtained. The profile is corrected by performing height smoothing (weighted average ±12) to remove fine projections and recesses. The maximum point of the respective projections in the corrected profile is taken as the height of the projections.

The measurement is performed at 23° C. and 30RH %.

The interlayer film of the present invention preferably contains a thermoplastic resin.

Examples of the thermoplastic resin include polyvinylidene fluoride, polytetrafluoroethylene, vinylidene fluoride-hexafluoropropylene copolymers, polytrifluoroethylene, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. In particular, polyvinyl acetal and ethylene-vinyl acetate copolymers are preferred, and polyvinyl acetal is more preferred.

The polyvinyl acetal can be produced by, for example, acetalization of a polyvinyl alcohol with an aldehyde. The polyvinyl alcohol can be produced by, for example, saponification of a polyvinyl acetate. The degree of saponification of the polyvinyl alcohol is usually in the range of 70 to 99.8 mol %.

The polyvinyl alcohol preferably has an average degree of polymerization of 200 or more, more preferably 500 or more, still more preferably 1700 or more, particularly preferably more than 1700, and preferably 5000 or less, still more preferably 4000 or less, further preferably 3000 or less, particularly preferably less than 3000. When the average degree of polymerization is equal to or more than the lower limit, the laminated glass has even higher penetration resistance. When the average degree of polymerization is equal to or lower than the upper limit, the molding of the interlayer film is easier.

The average degree of polymerization of the polyvinyl alcohol can be determined in accordance with JIS K6726 "Test method for polyvinyl alcohol".

The acetal group contained in the polyvinyl acetal may have any number of carbons. The polyvinyl acetal can be produced with any aldehyde. The lower limit of the carbon number of the acetal group in the polyvinyl acetal is preferably 3, and the upper limit thereof is preferably 6. When the acetal group in the polyvinyl acetal has a carbon number of 3 or greater, the interlayer film has a sufficiently low glass transition temperature. In addition, the bleed out of the plasticizer can be prevented. When the aldehyde has a carbon number of 6 or less, polyvinyl acetal can be easily synthesized, ensuring the productivity. The C3-C6 aldehyde may be a linear aldehyde or a branched aldehyde. Examples thereof include n-butylaldehyde and n-valeraldehyde.

The aldehyde is not limited. The aldehyde is preferably usually a C1-C10 aldehyde. Examples of such a C1-C10 aldehyde include propionaldehyde, n-butylaldehyde, isobutylaldehyde, n-valeraldehyde, 2-ethylbutylaldehyde, n-hexylaldehyde, n-octylaldehyde, n-nonylaldehyde, n-decylaldehyde, formaldehyde, acetoaldehyde, and benzaldehyde. In particular, propionaldehyde, n-butylaldehyde, isobutylaldehyde, n-hexylaldehyde, and n-valeraldehyde are preferred. Propionaldehyde, n-butylaldehyde, and isobutylaldehyde are more preferred. n-Butylaldehyde is still more preferred. These aldehydes may be used alone or in combination of two or more.

The polyvinyl acetal preferably has a hydroxy group content (amount of hydroxy groups) of 10 mol % or more, more preferably 15 mol % or more, still more preferably 18 mol % or more, and preferably 40 mol % or less, more preferably 35 mol % or less. When the hydroxy group content is equal to or more than the lower limit, the interlayer film has even higher adhesion. When the hydroxy group content is equal to or less than the upper limit, the interlayer film has high flexibility, making it easy to handle the interlayer film.

The hydroxy group content of the polyvinyl acetal herein means a mole fraction expressed in percentage (mol %), determined by dividing the amount of ethylene groups to which hydroxy groups are bonded by the amount of all the ethylene groups in the main chain. The amount of ethylene groups to which hydroxy groups are bonded may be determined, for example, in accordance with JIS K6726 "Testing methods for polyvinyl alcohol" or ASTM D1396-92.

The degree of acetylation (acetyl group content) of the polyvinyl acetal is preferably 0.1 mol % or more, more preferably 0.3 mol % or more, still more preferably 0.5 mol % or more, and preferably 30 mol % or less, more preferably 25 mol % or less, still more preferably 20 mol % or less. When the degree of acetylation is equal to or more than the lower limit, the polyvinyl acetal has higher compatibility with plasticizer. When the degree of acetylation is equal to or less than the upper limit, the interlayer film and the laminated glass have higher moisture resistance.

The degree of acetylation herein means the mole fraction expressed in percentage (mol %), determined by subtracting the amount of ethylene groups to which acetal groups are bonded and the amount of ethylene groups to which hydroxy groups are bonded from the amount of all the ethylene groups in the main chain and dividing the resultant difference by the amount of all the ethylene groups in the main chain. The amount of ethylene groups to which acetal groups are bonded can be determined, for example, in accordance with JIS K 6728 "Test method for polyvinyl butyral" or ASTMD 1396-92.

The degree of acetalization of the polyvinyl acetal (degree of butyralization, in the case of the polyvinyl butyral resin) is preferably 50 mol % or more, more preferably 53 mol % or more, still more preferably 60 mol % or more, particularly preferably 63 mol % or more, and preferably 85 mol % or less, more preferably 75 mol % or less, still more preferably 70 mol % or less. When the degree of acetalization is equal to or more than the lower limit, the polyvinyl acetal has higher compatibility with plasticizer. When the degree of acetalization is equal to or less than the upper limit, the production of the polyvinyl acetal requires less reaction time.

The degree of acetalization herein means the mole fraction, expressed in percentage (mol %), determined by dividing the amount of ethylene groups to which acetal groups are bonded by the amount of all the ethylene groups in the main chain.

The degree of acetalization can be calculated by measuring the degree of acetylation and the hydroxy group content in accordance with JIS K6728 "Test method for polyvinyl butyral" or ASTM D1396-92, calculating the mole fraction from the measurements, and then subtracting the degree of acetylation and the hydroxy group content from 100 mol %.

In order to further improve the adhesion of the interlayer film, the interlayer film of the present invention preferably contains a plasticizer.

Any plasticizer commonly used for an interlayer film for an automotive windshield can be used. Examples thereof include organic plasticizers such as monobasic organic acid esters or polybasic organic acid esters, and phosphoric acid plasticizers such as organophosphate compounds or organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethyl butyrate, tetraethylene glycol-di-n-heptanoate, diethylene glycol-di-2-ethylhexanoate, diethylene glycol-di-2-ethylbutyrate, and diethylene glycol-di-n-heptanoate. In particular, the interlayer film preferably contains triethylene glycol-di-2-ethylhexanoate, triethylene glycol-di-2-ethylbutyrate, or triethylene glycol-di-n-heptanoate, more preferably contains triethylene glycol-di-2-ethylhexanoate.

The amount of the plasticizer is not limited. The lower limit thereof is preferably 25 parts by mass, more preferably 30 parts by mass, based on 100 parts by mass of the thermoplastic resin. The upper limit thereof is preferably 80 parts by mass, more preferably 70 parts by mass. When the plasticizer content is equal to or more than the lower limit, the laminated glass can have even higher penetration resistance. When the plasticizer content is equal to or lower than the upper limit, the interlayer film has even higher transparency.

The interlayer film of the present invention preferably contains an adhesion modifier.

The adhesion modifier is preferably, for example, an alkali metal salt or an alkaline earth metal salt. Examples of the adhesion modifier include salts such as potassium, sodium, or magnesium salt.

Examples of the acid constituting the salts include carboxylic organic acids such as octylic acid, hexylic acid, 2-ethylbutyric acid, butyric acid, acetic acid, and formic acid and inorganic acids such as hydrochloric acid and nitric acid.

The interlayer film of the present invention may optionally contains additives such as an antioxidant, a light stabilizer, modified silicone oil as an adhesion modifier, a flame retardant, an antistatic agent, a moisture-proof agent, a heat reflecting agent, a heat absorbing agent, an anti-blocking agent, an antistatic agent, and a colorant containing pigment or dye.

The interlayer film for laminated glass of the present invention may have any thickness. From the viewpoint of the actual use and sufficient improvement in the heat insulating properties, the lower limit of the thickness is preferably 0.1 mm, more preferably 0.25 mm. The upper limit is preferably 3 mm, more preferably 1.5 mm. When the thickness of the interlayer film is equal to or more than the lower limit, the laminated glass has higher penetration resistance.

The interlayer film for laminated glass according to the present invention may be produced by any method. The interlayer film may be produced by a conventionally known method. For example, the interlayer film may be produced by kneading the thermoplastic resin and other optional components and molding the mixture into an interlayer film. Extrusion molding is preferred as it is suitable for continuous production.

The kneading may be performed by any method. For example, the kneading may be performed by a method in which an extruder, a plastograph, a kneader, a Banbury mixer, or a calender roll is used. In particular, a method in which an extruder is used is preferred because it is suitable for continuous production. A method in which a twin-screw extruder is used is more preferred.

The interlayer film for laminated glass of the present invention includes at least a first resin layer and a second resin layer as two or more resin layers. The hydroxy group content of polyvinyl acetal (hereafter, referred to as polyvinyl acetal A) in the first resin layer is preferably different from the hydroxy group content of polyvinyl acetal (hereafter, referred to as polyvinyl acetal B) in the second resin layer.

Since the polyvinyl acetal A and the polyvinyl acetal B have different properties, various properties that cannot be achieved by a monolayer structure can be imparted to the interlayer film for laminated glass. For example, in a case where the first resin layer is interposed between two second resin layers and the hydroxy group content of the polyvinyl acetal A is smaller than the hydroxy group content of the polyvinyl acetal B, the first resin layer tends to have a lower glass transition temperature than the second resin layer. As a result, the first resin layer is softer than the second resin layer, so that the interlayer film for laminated glass has better sound-insulating properties. For another example, in a case where the first resin layer is interposed between two second resin layers and the hydroxy group content of the polyvinyl acetal A is greater than the hydroxy group content of the polyvinyl acetal B, the first resin layer tends to have a higher glass transition temperature than the second resin layer. As a result, the first resin layer is harder than the second resin layer, so that the interlayer film for laminated glass has better penetration resistance.

Moreover, in a case where the first resin layer and the second resin layer contain a plasticizer, the plasticizer content (hereafter, referred to as content A) in the first resin layer based on 100 parts by mass of polyvinyl acetal is preferably different from the plasticizer content (hereafter, referred to as content B) in the second resin layer based on 100 parts by mass of polyvinyl acetal. For example, in a case where the first resin layer is interposed between two second resin layers and the content A is greater than the content B, the first resin layer tends to have a lower glass transition temperature than the second resin layer. As a result, the first resin layer is softer than the second resin layer, so that the interlayer film for laminated glass has better sound-insulating properties. In a case where the first resin layer is interposed between two second resin layers and the content A is smaller than the content B, the first resin layer tends to have a higher glass transition temperature than the second resin layer. As a result, the first resin layer is harder than the second resin layer, so that the interlayer film for laminated glass has better penetration resistance.

An exemplary combination of two or more resin layers included in the interlayer film for laminated glass of the present invention includes a sound insulation layer as the first resin layer and a protective layer as the second resin layer with an aim of improving the sound-insulating properties of the laminated glass. Preferably, the sound insulation layer contains polyvinyl acetal X and a plasticizer and the protective layer contains polyvinyl acetal Y and a plasticizer because the laminated glass can have better sound-insulating properties. Moreover, in a case where the sound insulation layer is interposed between two protective layers, an interlayer film for laminated glass excellent in sound-insulating properties (hereafter, also referred to as a sound-insulating interlayer film) can be obtained. Hereafter, a sound-insulating interlayer film is more specifically described.

In the sound-insulating interlayer film, the sound insulation layer has a function of imparting sound-insulating properties. The sound insulation layer preferably contains polyvinyl acetal X and a plasticizer.

The polyvinyl acetal X can be prepared by acetalization of polyvinyl alcohol with an aldehyde. Commonly, the polyvinyl alcohol can be obtained by saponification of polyvinyl acetate.

The lower limit of the average degree of polymerization of the polyvinyl alcohol is preferably 200, whereas the upper limit thereof is preferably 5000. When the average degree of polymerization of the polyvinyl alcohol is 200 or higher, the penetration resistance of the sound-insulating interlayer film to be obtained can be improved. When the average degree of polymerization of the polyvinyl alcohol is 5000 or lower, formability of the sound insulation layer can be ensured. The lower limit of the average degree of polymerization of the polyvinyl alcohol is more preferably 500, whereas the upper limit thereof is more preferably 4000.

The average degree of polymerization of the polyvinyl alcohol is determined in accordance with JIS K6726 "Testing methods for polyvinyl alcohol."

The lower limit of the carbon number of an aldehyde used for acetalization of the polyvinyl alcohol is preferably 4, whereas the upper limit thereof is preferably 6. When the carbon number of the aldehyde is 4 or more, the sound insulation layer can stably contain a sufficient amount of a plasticizer to exhibit excellent sound-insulating properties. Moreover, bleed-out of the plasticizer can be prevented. When the carbon number of the aldehyde is 6 or less, synthesis of the polyvinyl acetal X is facilitated to ensure the productivity.

The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the sound insulation layer can contain the plasticizer in an amount needed for exhibiting sound-insulating properties, and bleed-out of the plasticizer can be prevented. The upper limit of the hydroxy group content of the polyvinyl acetal X is more preferably 28 mol %, still more preferably 26 mol %, particularly preferably 24 mol %, whereas the lower limit thereof is preferably 10 mol %, more preferably 15 mol %, still more preferably 20 mol %. The hydroxy group content of the polyvinyl acetal X is a value in percentage (mol %) of the mole fraction obtained by dividing the amount of ethylene groups to which hydroxy groups are bonded by the amount of all the ethylene groups in the main chain. The amount of ethylene groups to which a hydroxy group is bonded can be obtained by measuring the amount of ethylene groups to which hydroxy groups are bonded in the polyvinyl acetal X in accordance with JIS K6728 "Testing methods for polyvinyl butyral."

The lower limit of the acetal group content of the polyvinyl acetal X is preferably 60 mol %, whereas the upper limit thereof is preferably 85 mol %. When the acetal group content of the polyvinyl acetal X is 60 mol % or more, the sound insulation layer has higher hydrophobicity and can contain a plasticizer in an amount needed for exhibiting sound-insulating properties, and bleed-out of the plasticizer and whitening can be prevented. When the acetal group content of the polyvinyl acetal X is 85 mol % or less, synthesis of the polyvinyl acetal X is facilitated to ensure the productivity. The lower limit of the acetal group content of the polyvinyl acetal X is more preferably 65 mol %, still more preferably 68 mol %.

The acetal group content can be obtained by measuring the amount of ethylene groups to which acetal groups are bonded in the polyvinyl acetal X in accordance with JIS K6728 "Testing methods of polyvinyl butyral."

The lower limit of the acetyl group content of the polyvinyl acetal X is preferably 0.1 mol %, whereas the upper limit thereof is preferably 30 mol %. When the acetyl group content of the polyvinyl acetal X is 0.1 mol % or more, the sound insulation layer can contain a plasticizer in an amount needed for exhibiting sound-insulating properties, and bleed-out of the plasticizer can be prevented. When the acetyl group content of the polyvinyl acetal X is 30 mol % or less, the sound insulation layer has higher hydrophobicity to prevent whitening. The lower limit of the acetyl group content is more preferably 1 mol %, still more preferably 5 mol %, particularly preferably 8 mol %, whereas the upper limit thereof is more preferably 25 mol %, still more preferably 20 mol %. The acetyl group content is a value in percentage (mol %) of the mole fraction obtained by subtracting the amount of ethylene groups to which an acetal group is bonded and the amount of ethylene groups to which hydroxy groups are bonded from the amount of all the ethylene groups in the main chain and dividing the resulting value by the amount of all the ethylene groups in the main chain.

In particular, the polyvinyl acetal X is preferably polyvinyl acetal with the acetyl group content of 8 mol % or more or polyvinyl acetal with the acetyl group content of less than 8 mol % and the acetal group content of 65 mol % or more because the sound insulation layer can easily contain a plasticizer in an amount needed for exhibiting sound-insulating properties. The polyvinyl acetal X is more preferably polyvinyl acetal having an acetyl group content of 8 mol % or more or polyvinyl acetal having an acetyl group content of less than 8 mol % and an acetal group content of 68 mol % or more.

The lower limit of the plasticizer content of the sound insulation layer is preferably 45 parts by mass, whereas the upper limit thereof is preferably 80 parts by mass based on 100 parts by mass of the polyvinyl acetal X. When the plasticizer content is 45 parts by mass or more, high sound-insulating properties can be exhibited. When the plasticizer content is 80 parts by mass or less, bleed-out of the plasticizer is prevented, so that the transparency or adhesiveness of the interlayer film for laminated glass is not lowered. The lower limit of the plasticizer content is more preferably 50 parts by mass, still more preferably 55 parts by mass, whereas the upper limit thereof is more preferably 75 parts by mass, still more preferably 70 parts by mass.

The lower limit of the thickness of the sound insulation layer is preferably 50 μm. When the thickness of the sound insulation layer is 50 μm or more, sufficient sound-insulating properties can be exhibited. The lower limit of the thickness of the sound insulation layer is more preferably 80 μm. The upper limit thereof is not particularly limited, and is preferably 300 μm in consideration of the thickness as an interlayer film for laminated glass.

The protective layer has a function of preventing bleed-out of a large amount of a plasticizer contained in the sound insulation layer to prevent lowering of the adhesiveness between the interlayer film for laminated glass and glass and imparting penetration resistance to the interlayer film for laminated glass.

The protective layer preferably contains, for example, polyvinyl acetal Y and a plasticizer, more preferably polyvinyl acetal Y with a greater hydroxy group content than the polyvinyl acetal X and a plasticizer.

The polyvinyl acetal Y can be prepared by acetalization of polyvinyl alcohol with an aldehyde. The polyvinyl alcohol can be commonly obtained by saponification of polyvinyl acetate.

The lower limit of the average degree of polymerization of the polyvinyl alcohol is preferably 200, whereas the upper limit thereof is preferably 5000. When the average degree of polymerization of the polyvinyl alcohol is 200 or more, the penetration resistance of the interlayer film for laminated glass can be improved. When the average degree of polymerization of the polyvinyl alcohol is 5000 or less, the formability of the protective layer can be ensured. The lower limit of the average degree of polymerization of the polyvinyl alcohol is more preferably 500, whereas the upper limit thereof is more preferably 4000.

The lower limit of the carbon number of an aldehyde used for acetalization of the polyvinyl alcohol is preferably 3, whereas the upper limit thereof is preferably 4. When the carbon number of the aldehyde is 3 or more, the penetration resistance of the interlayer film for laminated glass is improved. When the carbon number of the aldehyde is 4 or less, the productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, whereas the lower limit thereof is preferably 28 mol %. When the hydroxy group content of the polyvinyl acetal Y is 33 mol % or less, whitening of the interlayer film for laminated glass can be prevented. When the hydroxy group content of the polyvinyl acetal Y is 28 mol % or more, the penetration resistance of the interlayer film for laminated glass can be improved.

The lower limit of the acetal group content of the polyvinyl acetal Y is preferably 60 mol %, whereas the upper limit thereof is preferably 80 mol %. When the acetal group content is 60 mol % or more, the protective layer can contain a plasticizer in an amount needed for exhibiting sufficient penetration resistance. When the acetal group content is 80 mol % or less, the adhesiveness between the protective layer and glass can be ensured. The lower limit of the acetal group content is more preferably 65 mol %, whereas the upper limit thereof is more preferably 69 mol %.

The upper limit of the acetyl group content of the polyvinyl acetal Y is preferably 7 mol %. When the acetyl group content of the polyvinyl acetal Y is 7 mol % or less, the protective layer has higher hydrophobicity, thereby preventing whitening. The upper limit of the acetyl group content is more preferably 2 mol %, whereas the lower limit thereof is preferably 0.1 mol %. The hydroxy group contents, acetal group contents, and acetyl group contents of the polyvinyl acetal A, B, and Y can be measured by the similar method as in the case of the polyvinyl acetal X.

The lower limit of the plasticizer content of the protective layer is preferably 20 parts by mass, whereas the upper limit thereof is preferably 45 parts by mass based on 100 parts by mass of the polyvinyl acetal Y. When the plasticizer content is 20 parts by mass or more, the penetration resistance can be ensured. When the plasticizer content is 45 parts by mass or less, bleed-out of the plasticizer can be prevented, so that the transparency or adhesiveness of the interlayer film for laminated glass is not lowered. The lower limit of the plasticizer content is more preferably 30 parts by mass, still more preferably 35 parts by mass, whereas the upper limit thereof is more preferably 43 parts by mass, still more preferably 41 parts by mass. The plasticizer content of the protective layer is preferably smaller than the plasticizer content of the sound insulation layer because sound-insulating properties can be further improved in the laminated glass.

The hydroxy group content of the polyvinyl acetal Y is preferably greater than the hydroxy group content of the polyvinyl acetal X, more preferably greater by 1 mol % or more, still more preferably greater by 5 mol % or more, particularly preferably greater by 8 mol % or more because the sound-insulating properties of the laminated glass is further improved. Adjustment of the hydroxy group contents of the polyvinyl acetal X and the polyvinyl acetal Y allows control of the plasticizer contents in the sound insulation layer and the protective layer, lowering the glass transition temperature of the sound insulation layer. As a result, the sound-insulating properties of the laminated glass are further improved.

The plasticizer content (hereafter, also referred to as content X) based on 100 parts by mass of the polyvinyl acetal X in the sound insulation layer is preferably greater than the plasticizer content (hereafter, also referred to as content Y) based on 100 parts by mass of the polyvinyl acetal Y in the protective layer, more preferably greater by 5 parts by mass or more, still more preferably greater by 15 parts by mass or more, particularly preferably greater by 20 parts by mass or more because the sound-insulating properties of the laminated glass is still further improved. Adjustment of the content X and the content Y lowers the glass transition temperature of the sound insulation layer. As a result, the sound-insulating properties of the laminated glass are still further improved.

The thickness of the protective layer is not limited as long as it is adjusted within the range that allows the layer to serve as a protective layer. When the protective layer has projections and recesses, the protective layer is preferably as thick as possible in order to prevent the transcription of the projections and recesses into the interface between the protective layer and the sound insulating layer. Specifically, the lower limit of the thickness of the protective layer is preferably 100 μm, more preferably 300 μm, still more preferably 400 μm, particularly preferably 450 μm. The upper limit of the thickness of the protective layer is not limited. In order to ensure the thickness enough to achieve sufficient sound insulating properties, the upper limit is practically about 500 μm.

The sound insulating interlayer film may be produced by any method. For example, sheets of the sound insulating layer and the protective layer are formed by a usual sheet formation method such as an extrusion method, a calender method, or a press method, and then these sheets are laminated.

The interlayer film of the present invention preferably has a glossiness of 35% or less.

As used herein, the glossiness means the 75° specular glossiness measured in accordance with JIS Z 8741:1997 using, for example, a gloss meter (e.g., "GM-26PRO" available from Murakami Color Research Laboratory). When the interlayer film has a glossiness of 20% or less, the film can have minute projections and recesses, suppress autohesion when the films are laminated, and improve the handleability. The upper limit of the glossiness is more preferably 10% or less.

The interlayer film of the present invention may be produced by any method. A conventionally known method may be used.

In the present invention, a large number of recesses and a large number of projections may be formed on at least one surface of the interlayer film by, for example, an embossing roll method, a calender roll method, a profile extrusion method, a melt fracture method, or the like. In particular, an embossing roll method is preferred.

The present invention also encompasses an automotive windshield including a pair of glass plates and the interlayer film of the present invention between the glass plates.

The glass plates may be commonly used transparent plate glass. Examples thereof include inorganic glass such as float plate glass, polished plate glass, molded plate glass, wired glass, wire-reinforced plate glass, colored plate glass, heat ray-absorbing glass, heat ray-reflecting glass, and green glass. UV-shielding glass with a UV-shielding coating layer on the surface may also be used. Further, organic plastic plates such as polyethylene terephthalate, polycarbonate, and polyacrylate plates may also be used.

Two or more different glass plates may be used as the glass plates. For example, the interlayer film for an automotive windshield of the present invention may be interposed between a transparent float plate glass and a colored glass plate such as green glass to produce a laminated glass. Two or more glass plates different in thickness may be used as the glass plates.

The automotive windshield of the present invention can be suitably produced by a vacuum deaeration method.

In the vacuum deaeration method, a laminate including at least two glass plates and the interlayer film for an automotive windshield therebetween is put into a rubber bag and vacuum-suctioned to be preliminarily pressure-bonded, while air remaining between the glass plates and the interlayer film is removed. Then, the laminate is pressurized with heat, for example, in an autoclave to be fully pressure-bonded. An automotive windshield can be produced in this manner.

When the laminate is transported, the laminate is transported standing in the longitudinal direction of the windshield (standing such that the longitudinal direction is parallel to the ground). This prevents the displacement between the glass and the interlayer film for an automotive windshield in the laminate, resulting in high production efficiency.

Advantageous Effects of Invention

The present invention provides an interlayer film for an automotive windshield which, while having recesses in the shape of engraved lines, enables the production of automotive windshields with high yield by a vacuum deaeration method; a roll of the interlayer film for an automotive windshield; and an automotive windshield including the interlayer film for an automotive windshield.

DESCRIPTION OF EMBODIMENTS

Figure 1:
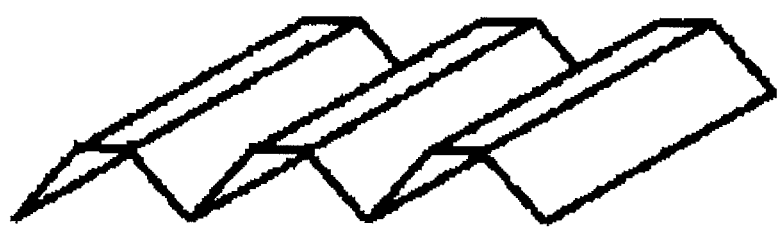
FIG. 1 is a schematic view illustrating an exemplary interlayer film for laminated glass in which recesses having a groove shape with a continuous bottom are arranged at equal intervals and adjacently side by side in parallel with one another on a surface.
Figure 2:
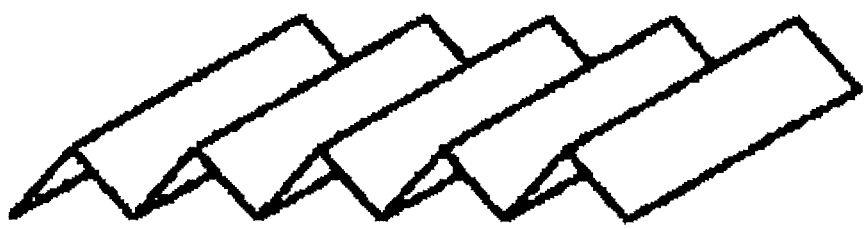
FIG. 2 is a schematic view illustrating an exemplary interlayer film for laminated glass in which recesses having a groove shape with a continuous bottom are arranged at equal intervals and adjacently side by side in parallel with one another on a surface.
Figure 3:
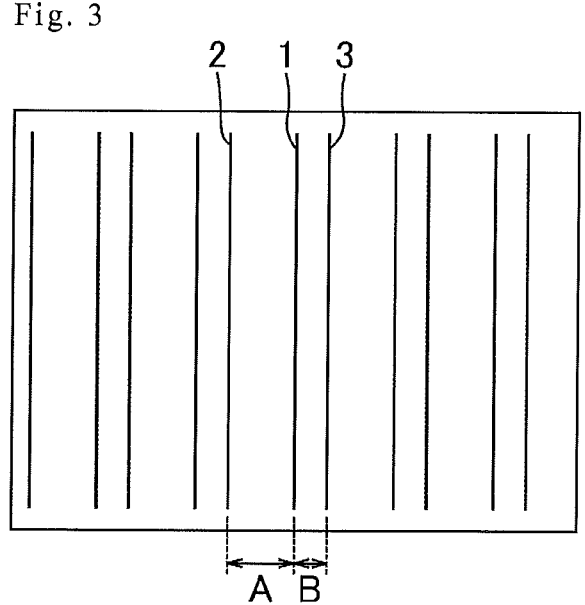
FIG. 3 is a schematic view illustrating an exemplary interlayer film for laminated glass in which recesses having a groove shape with a continuous bottom are arranged at unequal intervals and adjacently side by side in parallel with one another on a surface.
Figure 4:
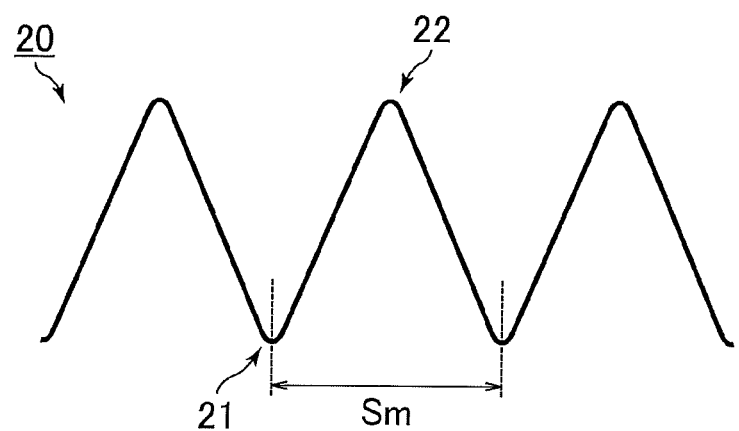
FIG. 4 is a schematic view for explaining an interval Sm between recesses and a radius of rotation R of a tip of a projection.
Figure 4:
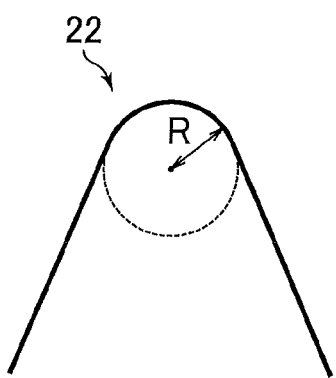

The embodiments of the present invention are further described with reference to example. The present invention is not limited to the examples.

Examples 1 to 4, Comparative Examples 1 and 2

(1) Preparation of Interlayer Film

Polyvinyl alcohol having an average degree of polymerization of 1700 was acetalized with n-butylaldehyde to prepare polyvinyl butyral (acetyl group content: 1 mol %, butyral group content: 69 mol %, hydroxy group content: 30 mol %). To 100 parts by mass of the polyvinyl butyral were added 40 parts by mass of ethyleneglycol-di-2-ethylhexanoate (3GO) as a plasticizer and a 50% by mass: 50% by mass mixture of magnesium bis(2-ethyl butyrate) and magnesium acetate as an adhesion modifier in such an amount that the magnesium concentration in the film was 50 ppm. The mixture was sufficiently kneaded with a mixing roll. Thus, a resin composition was obtained.

The obtained resin composition was extruded with an extruder, whereby a single-layer interlayer film with a thickness of 760 µm was obtained.

In the first step, a pattern of projections and recesses was randomly transferred to both surfaces of the interlayer film for laminated glass by the following process. First, random projections and recesses were formed on the surface of iron rolls with an abrasive material, and the iron rolls were subjected to vertical grinding. Finer projections and recesses were further formed on planar portions after the grinding with a finer abrasive material. In this manner, a pair of rolls in the same shape having a coarse main embossed pattern and a fine sub-embossed pattern was obtained. The pair of rolls was used as a device for transferring a pattern of projections and recesses to transfer a random pattern of projections and recesses to both surfaces of the interlayer film. The transferring conditions employed here were a temperature of the interlayer film for laminated glass of 80° C., a temperature of the rolls of 145° C., a linear velocity of 10 m/min, and a linear pressure of 10 to 200 kN/m.

In the second step, projections and recesses having a groove shape with a continuous bottom (shape of an engraved line) were imparted to a surface of the interlayer film by the following process. A pair of rolls including a metal roll having a surface milled with a triangular oblique line-type mill and a rubber roll having a JIS hardness of 65 to 75 was used as a device for transferring a pattern of projections and recesses. The obtained interlayer film was passed through the device for transferring a pattern of projections and recesses, whereby projections and recesses in which recesses having a groove shape with a continuous bottom (shape of an engraved line) were arranged side by side in parallel with one another at equal intervals were imparted to one surface (surface A) of the interlayer film such that the recesses having groove shape with a continuous bottom were inclined at 35° or more relative to the machine direction of the film. Specifically, the inclination of the recesses was 80° in Example 1, 55° in Example 2, 45° in Example 3, 35° in Example 4, 20° in Comparative Example 1, and 0° in Comparative Example 2. The transferring was performed under the conditions of a temperature of the interlayer film of 70° C., a roll temperature of 145° C., a linear velocity of 10 m/min, and a linear pressure of 5 to 100 kN/m.

Subsequently, the same treatment was performed to impart recesses having a groove shape with a continuous bottom (shape of an engraved line) to the other surface (surface B) of the interlayer film, except that the shape of the projections and recesses on a metal roll used was different. The direction of the recesses in the shape of engraved lines of the surface B was the same as that of the surface A.

The film thickness after the formation of engraved lines was measured. The film thickness in the width direction and the machine direction was 760 µm. The difference between the maximum thickness and the minimum thickness was 26 µm. The thickness profile was divided at 15 cm intervals in the measurement direction, and the difference between the maximum thickness and the minimum thickness in each section was recorded. The difference was 12 µm in the section where the difference was largest.

(2) Evaluation of Projections and Recesses of Interlayer Film for Automotive Windshield In accordance with JIS B-0601 (1994), the roughness (Rz) of the recesses in the shape of engraved lines on each of the surfaces A and B of the obtained interlayer film was determined. The measurement direction was perpendicular to the engraved lines. Measurement was performed under the conditions of a cut-off value of 2.5 mm, a standard length of 2.5 mm, evaluation length of 12.5 mm, a tip radius of a stylus of 2 µm, a tip angle of 60°, and a measurement rate of 0.5 mm/s.

The interval Sm of the recesses in the shape of engraved lines was determined as follows. Each of the first and second surfaces of the interlayer film was observed at five sites (observation range: 20 mm×20 mm) with an optical microscope (BS-D8000 III produced by SONIC Corp.), and the shortest distances between deepest bottoms of observed adjacent recesses were measured. The average of the measured shortest distances was taken as the interval Sm.

The interlayer film for laminated glass was cut in the direction perpendicular to the direction of the recesses in the shape of engraved lines and perpendicular to the film thickness. The cross section was observed with a microscope ("DSX-100" available from Olympus Corp.). The cross section was photographed at a 555-fold magnification. The obtained image was magnified to 50 µm/20 mm. In the magnified state, the radius of a circle drawn such that it was inscribed in the apex of a projection was measured as the radius of rotation of the projection.

(3) Evaluation of Roughness of Tip Portions of Projections

The roughness of the tip portions of the projections was determined as follows. Using a three-dimensional profilometer ("KS-1100" available from Keyence Corporation, head: model "LT-9510VM"), the shape of the surface A and the surface B of the interlayer films for laminated glass obtained in examples and comparative examples was measured in a measurement range of 20 mm×20 mm. The resulting data was processed with "KS-measure", measurement software included with the profilometer. Thus, three-dimensional image data of the surface A and surface B was obtained.

In the obtained data, the roughness within a length of 2.5 mm along the direction parallel to the direction in which the apex portions of the projections were continuous was measured using "KS-Analyzer Ver. 2.00", analysis software included with the profilometer, in the line roughness measurement mode, so that roughness profile data was obtained. In the same manner, roughness profile data of 10 sites was obtained from the three-dimensional image data. Here, the roughness profile data was obtained at a cut-off value of 2.5 mm. Height smoothing and tilt correction were not performed. The Rz was calculated from the obtained roughness profile data in accordance with JIS B-0601 (1994). The average of the Rz values obtained from the roughness profile data of 10 sites was taken as the roughness of the tip portions of the projections.

The measurement conditions other than the field of view were as follows: stage feed condition: continuous; scan direction: bi-directional scanning; leading axis: X-axis; stage travel rate: 250.0 µm/s; and axis feed rate: 10000.0 µm/s. The measuring pitch of X-axis is set at 2.0 µm, and that of Y-axis is set at 2.0 µm. When the interval between the engraved lines was so large that the measurement distance was insufficient, a field of view adjacent to the measurement field of view was measured in the same manner to increase the number of measurement sites. The "apex portion" of a projection in the measurement of the roughness of the tip portions is defined as follows. When the point at which the height of the projection is highest is positioned at the middle of a straight line connecting the deepest bottoms of two adjacent recesses in the 2 cm×2 cm field of view, the apex portion is a range corresponding to 10% of the length of the straight line connecting the deepest bottoms, centered on the middle of the straight line. When the point at which the height of the projection is highest is not positioned at the middle of the straight line connecting the deepest bottoms of two adjacent recesses in the 2 cm×2 cm field of view, the apex portion is a range corresponding to 10% of the length of the straight line connecting the deepest bottoms, centered on the point at which the height of the projection is highest. The maximum height point of the projections was measured as follows. A cross-sectional profile in the direction perpendicular to the recesses in the obtained image was obtained. The profile was corrected by performing height smoothing (weighted average ±12) to remove fine projections and recesses. The maximum point of the projections in the corrected profile was taken as the heights of projections.

The measurement results of the surface A of the interlayer film are shown in Table 1. The measurement results of the surface B were the same as those of the surface A and thus are omitted in the table.

(4) Measurement of Friction Between Glass and Interlayer Film

The obtained interlayer film was allowed to stand at 23° C. and 50% RH for six hours to perform humidity control. Thereafter, the interlayer film for laminated glass was placed with the surface A upward. Five float glass plates (7.5 cm long×7.5 cm wide×about 2.5 mm high) that complied with JIS R3202:1996 were laminated on the interlayer film. The five float glass sheets were bonded to each other and fixed together. The total weight of the five float glass plates thus laminated was 176 g. Iron wire having a length of 15 cm with a ring attached to one end was fixed with tape to the top surface of the glass plate such that the wire extended from the middle portion of the top surface toward the direction perpendicular to the machine direction of the film in the production of the interlayer film for an automotive windshield. A spring balance was hooked to the ring. The glass used was float glass and was placed such that the tin-contact side was in contact with the interlayer film. The glass was used after washing so that no plasticizer or foreign matter was attached thereto. The surface roughness of the glass was 0.013 µm, as measured with "Serfcorder SE300" available from Kosaka Laboratory Ltd. The measurement conditions were in accordance with those for the roughness "Rz" of the recesses of the film. The arithmetic average roughness "Ra" as measured under the same conditions was 0.065 µm.

With the interlayer film being fixed, the spring balance was pulled at 6 cm/s in the direction that was the horizontal direction and perpendicular to the machine direction of the film in the production of the interlayer film for an automotive windshield. The value displayed by the spring balance during the glass plate moved at a constant rate was recorded. This procedure was repeated five times. The average of the five measurements was taken as friction between the glass and the interlayer film. When the glass rolled on the interlayer film during the glass plate moved at a constant rate, the procedure was redone. The measurement was performed at 23° C. and 30RH %.

Table 1 shows the results. The measurement results of the surface B were the same as those of the side A and thus are omitted in the table.

TABLE 1

| | | | | Example 1 | Example 2 | Example 3 | Example 4 | Comparative Example 1 | Comparative Example 2 |
|---|---|---|---|---|---|---|---|---|---|
| Composition of interlayer film | Polyvinyl butyral resin | Average degree of polymerization of PVA | | 1700 | 1700 | 1700 | 1700 | 1700 | 1700 |
| | | Degree of butyralization | mol % | 69 | 69 | 69 | 69 | 69 | 69 |

TABLE 1-continued

|  |  |  |  | Example 1 | Example 2 | Example 3 | Example 4 | Comparative Example 1 | Comparative Example 2 |
|---|---|---|---|---|---|---|---|---|---|
|  |  | Degree of acetylation | mol % | 1 | 1 | 1 | 1 | 1 | 1 |
|  |  | Hydroxy group content | mol % | 30 | 30 | 30 | 30 | 30 | 30 |
|  |  | Amount | Parts by mass | 100 | 100 | 100 | 100 | 100 | 100 |
|  | Plasticizer | Type |  | 3GO | 3GO | 3GO | 3GO | 3GO | 3GO |
|  |  | Amount | Parts by mass | 40 | 40 | 40 | 40 | 40 | 40 |
| Shape of projections and recesses | Interval between recesses |  | μm | 290 | 290 | 290 | 290 | 290 | 290 |
|  | Roughness of recesses in the shape of engraved lines |  | μm | 36 | 36 | 36 | 36 | 36 | 36 |
|  | Radius of rotation of tip portion |  | μm | 28 | 28 | 28 | 28 | 28 | 28 |
|  | Roughness of tip portions |  | μm | 14 | 14 | 14 | 14 | 14 | 14 |
|  | Inclination of recesses in the shape of engraved lines relative to machine direction of interlayer film in production of the film |  | degree (°) | 80 | 55 | 45 | 35 | 20 | 0 |
|  | Glass/interlayer film friction (g) |  |  | 220 | 180 | 180 | 170 | 140 | 120 |

Examples 5 to 7, Comparative Examples 3 and 4

An interlayer film for an automotive windshield was obtained and the friction between the glass and the interlayer film for an automotive windshield was measured in the same manner as in Example 1, except that the shape of the projections and recesses imparted to the film was changed by changing the shape of the embossing rolls in the first step, the triangular oblique line-type roll, and the inclination of the recesses having a groove shape with a continuous bottom relative to the machine direction of the film.

Table 2 shows the results.

Examples 8 to 11, Comparative Example 5

An interlayer film for an automotive windshield was obtained and the friction between the glass and the interlayer film for an automotive windshield was measured in the same manner as in Example 1, except that the shape of the projections and recesses imparted to the film was changed by changing the shape of the embossing rolls in the first step, the triangular oblique line-type roll, and the inclination of the recesses having a groove shape with a continuous bottom relative to the machine direction of the film.

Table 3 shows the results.

TABLE 2

|  |  |  |  | Example 5 | Example 6 | Example 7 | Comparative Example 3 | Comparative Example 4 |
|---|---|---|---|---|---|---|---|---|
| Composition of interlayer film | Polyvinyl butyral resin | Average degree of polymerization of PVA |  | 1700 | 1700 | 1700 | 1700 | 1700 |
|  |  | Degree of butyralization | mol % | 69 | 69 | 69 | 69 | 69 |
|  |  | Degree of acetylation | mol % | 1 | 1 | 1 | 1 | 1 |
|  |  | Hydroxy group content | mol % | 30 | 30 | 30 | 30 | 30 |
|  |  | Amount | Parts by mass | 100 | 100 | 100 | 100 | 100 |
|  | Plasticizer | Type |  | 3GO | 3GO | 3GO | 3GO | 3GO |
|  |  | Amount | Parts by mass | 40 | 40 | 40 | 40 | 40 |
| Shape of projections and recesses | Interval between recesses |  | μm | 292 | 292 | 292 | 290 | 290 |
|  | Roughness of recesses in the shape of engraved lines |  | μm | 42 | 42 | 42 | 55 | 55 |
|  | Radius of rotation of tip portion |  | μm | 55 | 55 | 55 | 28 | 28 |
|  | Roughness of tip portions |  | μm | 20 | 20 | 20 | 14 | 14 |
|  | Inclination of recesses in the shape of engraved lines relative to machine direction of interlayer film in production of the film |  | degree (°) | 80 | 45 | 35 | 20 | 0 |
|  | Glass/interlayer film friction (g) |  |  | 220 | 190 | 180 | 140 | 120 |

TABLE 3

|  |  |  | Example 8 | Example 9 | Example 10 | Example 11 | Comparative Example 5 |
|---|---|---|---|---|---|---|---|
|  | Polyvinyl butyral resin | Average degree of polymerization of PVA |  | 1700 | 1700 | 1700 | 1700 | 1700 |
|  |  | Degree of butyralization | mol % | 69 | 69 | 69 | 69 | 69 |
|  |  | Degree of acetylation | mol % | 1 | 1 | 1 | 1 | 1 |
|  |  | Hydroxy group content | mol % | 30 | 30 | 30 | 30 | 30 |
|  |  | Amount | Parts by mass | 100 | 100 | 100 | 100 | 100 |
|  | Plasticizer | Type |  | 3GO | 3GO | 3GO | 3GO | 3GO |
|  |  | Amount | Parts by mass | 40 | 40 | 40 | 40 | 40 |
| Shape of recesses and projections | Interval between recesses |  | μm | 380 | 380 | 380 | 380 | 380 |
|  | Roughness of recesses in the shape of engraved lines |  | μm | 45 | 45 | 45 | 45 | 45 |
|  | Radius of rotation of tip portion |  | μm | 30 | 30 | 30 | 30 | 30 |
|  | Roughness of tip portions |  | μm | 12 | 12 | 12 | 12 | 12 |
|  | Inclination of recesses in the shape of engraved lines relative to machine direction of interlayer film in production of the film |  | degree (°) | 80 | 55 | 45 | 35 | 0 |
|  | Glass/interlayer film friction (g) |  |  | 220 | 200 | 180 | 170 | 150 |

Examples 12 to 14, Comparative Examples 6 and 7

An interlayer film for an automotive windshield was obtained and the friction between the glass and the interlayer film for an automotive windshield was measured in the same manner as in Example 1, except that the shape of the projections and recesses imparted to the film was changed by changing the shape of the embossing rolls in the first step, the triangular oblique line-type roll, and the inclination of the recesses having a groove shape with a continuous bottom relative to the machine direction of the film.
Table 4 shows the results.

Examples 15 to 17, Comparative Example 8

An interlayer film for an automotive windshield was obtained and the friction between the glass and the interlayer film for an automotive windshield was measured in the same manner as in Example 1, except that the shape of the projections and recesses imparted to the film and the inclination of the recesses having a groove shape with a continuous bottom relative to the machine direction of the film were changed by changing the shape of the embossing rolls in the first step and the triangular oblique line-type mill.
Table 5 shows the results.

TABLE 4

|  |  |  |  | Example 12 | Example 13 | Example 14 | Comparative Example 6 | Comparative Example 7 |
|---|---|---|---|---|---|---|---|---|
| Composition of interlayer film | Polyvinyl butyral resin | Average degree of polymerization of PVA |  | 1700 | 1700 | 1700 | 1700 | 1700 |
|  |  | Degree of butyralization | mol % | 69 | 69 | 69 | 69 | 69 |
|  |  | Degree of acetylation | mol % | 1 | 1 | 1 | 1 | 1 |
|  |  | Hydroxy group content | mol % | 30 | 30 | 30 | 30 | 30 |
|  |  | Amount | Parts by mass | 100 | 100 | 100 | 100 | 100 |
|  | Plasticizer | Type |  | 3GO | 3GO | 3GO | 3GO | 3GO |
|  |  | Amount | Parts by mass | 40 | 40 | 40 | 40 | 40 |
| Shape of projections and recesses | Interval between recesses |  | μm | 416 | 416 | 416 | 416 | 416 |
|  | Roughness of recesses in the shape of engraved lines |  | μm | 31 | 31 | 31 | 31 | 31 |
|  | Radius of rotation of tip portion |  | μm | 50 | 50 | 50 | 50 | 50 |
|  | Roughness of tip portions |  | μm | 0.2 | 0.2 | 0.2 | 0.2 | 0.2 |
|  | Inclination of recesses in the shape of engraved lines relative to machine direction of interlayer film in production of the film |  | degree (°) | 80 | 45 | 35 | 20 | 0 |
|  | Glass/interlayer film friction (g) |  |  | 280 | 210 | 200 | 160 | 140 |

TABLE 5

|  |  |  |  | Example 15 | Example 16 | Example 17 | Comparative Example 8 |
|---|---|---|---|---|---|---|---|
| Composition of interlayer film | Polyvinyl butyral resin | Average degree of polymerization of PVA | | 1700 | 1700 | 1700 | 1700 |
| | | Degree of butyralization | mol % | 69 | 69 | 69 | 69 |
| | | Degree of acetylation | mol % | 1 | 1 | 1 | 1 |
| | | Hydroxy group content | mol % | 30 | 30 | 30 | 30 |
| | | Amount | Parts by mass | 100 | 100 | 100 | 100 |
| | Plasticizer | Type | | 3GO | 3GO | 3GO | 3GO |
| | | Amount | Parts by mass | 40 | 40 | 40 | 40 |
| Shape of recesses and projections | | Interval between recesses | μm | 396 | 396 | 390 | 389 |
| | | Roughness of recesses in the shape of engraved lines | μm | 31 | 31 | 31 | 31 |
| | | Radius of rotation of tip portion | μm | 85 | 85 | 85 | 85 |
| | | Roughness of tip portions | μm | 25 | 25 | 25 | 25 |
| | | Inclination of recesses in the shape of engraved lines relative to machine direction of interlayer film in production of the film | degree (°) | 80 | 45 | 35 | 20 |
| | | Glass/interlayer film friction | (g) | 200 | 180 | 180 | 140 |

Examples 18 to 22, Comparative Example 9

An interlayer film for an automotive windshield was obtained and the friction between the glass and the interlayer film for an automotive windshield was measured in the same manner as in Example 1, except that the shape of the projections and recesses imparted to the film and the inclination of the recesses having a groove shape with a continuous bottom relative to the machine direction of the film were changed by changing the shape of the embossing rolls in the first step and the triangular oblique line-type mill.

Table 6 shows the results.

Examples 23 to 26, Comparative Example 10

The step of "(1) Preparation of interlayer film for laminated glass" in Example 1 was changed as follows.
(Preparation of Resin Composition for Protective Layer)

Polyvinyl alcohol having an average degree of polymerization of 1700 was acetalized with n-butylaldehyde to prepare polyvinyl butyral (acetyl group content: 1 mol %, butyral group content: 69 mol %, hydroxy group content: 30 mol %). To 100 parts by mass of the polyvinyl butyral were added 40 parts by mass of triethyleneglycol-di-2-ethylhexanoate (3GO) as a plasticizer and a 50% by mass: 50% by mass mixture of magnesium bis(2-ethylbutyrate) and magnesium acetate as an adhesion modifier in such an amount that the magnesium concentration in the film was 50

TABLE 6

|  |  |  |  | Example 18 | Example 19 | Example 20 | Example 21 | Example 22 | Comparative Example 9 |
|---|---|---|---|---|---|---|---|---|---|
| Composition of interlayer film | Polyvinyl butyral resin | Average degree of polymerization of PVA | | 1700 | 1700 | 1700 | 1700 | 1700 | 1700 |
| | | Degree of butyralization | mol % | 69 | 69 | 69 | 69 | 69 | 69 |
| | | Degree of acetylation | mol % | 1 | 1 | 1 | 1 | 1 | 1 |
| | | Hydroxy group content | mol % | 30 | 30 | 30 | 30 | 30 | 30 |
| | | Amount | Parts by mass | 100 | 100 | 100 | 100 | 100 | 100 |
| | Plasticizer | Type | | 3GO | 3GO | 3GO | 3GO | 3GO | 3GO |
| | | Amount | Parts by mass | 40 | 40 | 40 | 40 | 40 | 40 |
| Shape of projections and recesses | | Interval between recesses | μm | 178 | 180 | 180 | 185 | 185 | 185 |
| | | Roughness of recesses in the shape of engraved lines | μm | 42 | 42 | 42 | 55 | 36 | 36 |
| | | Radius of rotation of tip portion | μm | 51 | 50 | 50 | 22 | 60 | 60 |
| | | Roughness of tip portions | μm | 13 | 13 | 13 | 13 | 13 | 13 |
| | | Inclination of recesses in the shape of engraved lines relative to machine direction of interlayer film in production of the film | degree (°) | 70 | 55 | 45 | 55 | 35 | 10 |
| | | Glass/interlayer film friction | (g) | 220 | 210 | 200 | 200 | 180 | 160 | ppm. The mixture was sufficiently kneaded with a mixing roll. Thus, a resin composition for protective layer was obtained.

(Preparation of Resin Composition for Sound Insulation Layer)

Polyvinyl alcohol having an average degree of polymerization of 2300 was acetalized with n-butyraldehyde to prepare polyvinyl butyral (acetyl group content of 12 mol %, butyral group content of 64 mol %, hydroxy group content of 24 mol %). To 100 parts by mass of the obtained polyvinyl butyral was added 60 parts by mass of triethylene glycol-di-2-ethylhexanoate (3GO) as a plasticizer. The mixture was sufficiently kneaded with a mixing roll. Thus, a resin composition for sound insulation layer was obtained.

(Preparation of Interlayer Film for Laminated Glass)

The obtained resin composition for sound insulation layer and the resin composition for protective layer were co-extruded from a co-extruder to produce an interlayer film for laminated glass having a triple layer structure in which a first surface layer (protective layer) formed of the resin composition for protective layer, an intermediate layer (sound insulation layer) formed of the resin composition for sound insulation layer, and a second surface layer (protective layer) formed of the resin composition for protective layer were laminated in the stated order.

In the subsequent steps, an interlayer film for laminated glass was prepared and the friction between glass and the interlayer film for an automotive windshield was measured in the same manner as in Example 1, except that the shape of the projections and recesses imparted to the film and the inclination of the recesses having a groove shape with a continuous bottom relative to the machine direction of the film were changed by changing the shape of embossing rolls in the first step and the triangular oblique line-type mill among the conditions for preparing the interlayer film for laminated glass.

Table 7 shows the results.

TABLE 7

|  |  |  |  | Example 23 | Example 24 | Example 25 | Example 26 | Comparative Example 10 |
|---|---|---|---|---|---|---|---|---|
| Composition of protective layer | Polyvinyl butyral resin | Average degree of polymerization of PVA |  | 1700 | 1700 | 1700 | 1700 | 1700 |
|  |  | Degree of butyralization | mol % | 69 | 69 | 69 | 69 | 69 |
|  |  | Degree of acetylation | mol % | 1 | 1 | 1 | 1 | 1 |
|  |  | Hydroxy group content | mol % | 30 | 30 | 30 | 30 | 30 |
|  |  | Amount | Parts by mass | 100 | 100 | 100 | 100 | 100 |
|  | Plasticizer | Type |  | 3GO | 3GO | 3GO | 3GO | 3GO |
|  |  | Amount | Parts by mass | 40 | 40 | 40 | 40 | 40 |
| Composition of sound insulation layer | Polyvinyl butyral resin | Average degree of polymerization of PVA |  | 2300 | 2300 | 2300 | 2300 | 2300 |
|  |  | Degree of butyralization | mol % | 64 | 64 | 64 | 64 | 64 |
|  |  | Degree of acetylation | mol % | 12 | 12 | 12 | 12 | 12 |
|  |  | Hydroxy group content | mol % | 24 | 24 | 24 | 24 | 24 |
|  |  | Amount | Parts by mass | 100 | 100 | 100 | 100 | 100 |
|  | Plasticizer | Type |  | 3GO | 3GO | 3GO | 3GO | 3GO |
|  |  | Amount | Parts by mass | 60 | 60 | 60 | 60 | 60 |
| Shape of projections and recesses |  | Interval between recesses | μm | 290 | 290 | 290 | 290 | 290 |
|  |  | Roughness of recesses in the shape of engraved lines | μm | 36 | 36 | 36 | 36 | 36 |
|  |  | Radius of rotation of tip portion | μm | 28 | 28 | 28 | 28 | 28 |
|  |  | Roughness of tip portions | μm | 14 | 14 | 14 | 14 | 14 |
|  |  | Inclination of recesses in the shape of engraved lines relative to machine direction of interlayer film in production of the film | degree (°) | 80 | 55 | 45 | 35 | 20 |
|  |  | Glass/interlayer film friction (g) |  | 220 | 180 | 180 | 170 | 140 |

INDUSTRIAL APPLICABILITY

The present invention provides an interlayer film for an automotive windshield which, while having recesses in the shape of engraved lines, enables the production of automotive windshields with high yield by a vacuum deaeration method; a roll of the interlayer film for an automotive windshield; and an automotive windshield including the interlayer film for an automotive windshield.

REFERENCE SIGNS LIST 1 recess
2 recess
3 recess
A interval between recess 1 and recess 2
B interval between recess 1 and recess 3
20 projections and recesses on surface having a large number of recesses and a large number of projections
21 recess having a groove shape with a continuous bottom 22 projection
R radius of rotation of tip of projection

The invention claimed is:

1. An interlayer film for an automotive windshield, the interlayer film comprising, on at least one surface thereof:
   a large number of recesses; and
   a large number of projections,
   the recesses having a groove shape with a continuous bottom,
   the recesses being adjacently arranged regularly side by side in parallel with one another,
   the recesses in a groove shape with a continuous bottom being inclined at 35° or more relative to a machine direction of the film in production of the interlayer film for an automotive windshield.

2. The interlayer film for an automotive windshield according to claim 1,
   wherein tip portions of the projections have a roughness of 30 μm or less.

3. The interlayer film for an automotive windshield according to claim 1,
   wherein the projections each have a tip with a radius of rotation of 20 μm or more.

4. A roll obtained by winding the interlayer film for an automotive windshield according to claim 1 in the machine direction of the film in production of the interlayer film for an automotive windshield.

5. An automotive windshield, comprising:
   a pair of glass plates; and
   the interlayer film for an automotive windshield according to claim 1 between the glass plates.

6. The interlayer film for an automotive windshield according to claim 2,
   wherein the projections each have a tip with a radius of rotation of 20 μm or more.

7. A roll obtained by winding the interlayer film for an automotive windshield according to claim 2 in the machine direction of the film in production of the interlayer film for an automotive windshield.

8. A roll obtained by winding the interlayer film for an automotive windshield according to claim 3 in the machine direction of the film in production of the interlayer film for an automotive windshield.

9. A roll obtained by winding the interlayer film for an automotive windshield according to claim 6 in the machine direction of the film in production of the interlayer film for an automotive windshield.

10. An automotive windshield, comprising:
    a pair of glass plates; and
    the interlayer film for an automotive windshield according to claim 2 between the glass plates.

11. An automotive windshield, comprising:
    a pair of glass plates; and
    the interlayer film for an automotive windshield according to claim 3 between the glass plates.

12. An automotive windshield, comprising:
    a pair of glass plates; and
    the interlayer film for an automotive windshield according to claim 6 between the glass plates.

* * * * *